United States Patent
Wong et al.

(10) Patent No.: US 7,600,059 B2
(45) Date of Patent: Oct. 6, 2009

(54) MULTIPLE LUN SUPPORT FOR SATA DEVICES

(75) Inventors: Jim Wong, Monrovia, CA (US); Osama Aweida, Broomfield, CO (US); Don Matthews, Woodland Park, CO (US)

(73) Assignee: Quantum Corporation, San Jose, CA (US)

( * ) Notice: Subject to any disclaimer, the term of this patent is extended or adjusted under 35 U.S.C. 154(b) by 238 days.

(21) Appl. No.: 11/443,824

(22) Filed: May 31, 2006

(65) Prior Publication Data

US 2008/0127222 A1    May 29, 2008

(51) Int. Cl.
*G06F 13/00* (2006.01)

(52) U.S. Cl. .......................... 710/33; 719/321

(58) Field of Classification Search ............ 710/5; 711/4, 100; 707/204
See application file for complete search history.

(56) References Cited

U.S. PATENT DOCUMENTS

| | | | |
|---|---|---|---|
| 6,574,696 B1 | 6/2003 | Jerman | |
| 6,925,519 B2 | 8/2005 | Day | |
| 7,082,483 B2* | 7/2006 | Poo | 710/68 |
| 7,146,476 B2* | 12/2006 | Sandorfi et al. | 711/162 |
| 2005/0226059 A1* | 10/2005 | Kavuri et al. | 365/189.05 |
| 2006/0107016 A1* | 5/2006 | Murotani et al. | 711/170 |
| 2006/0282194 A1* | 12/2006 | Schaefer et al. | 700/245 |

OTHER PUBLICATIONS

'The Mass Storage Driver Stack'. Apple Computer Developer Connection [online]. Dec. 6, 2005. [retrieved on Mar. 6, 2006]. Retrieved from the Internet: <URL: http://developer.apple.com/documentation/DeviceDrivers/Conceptual/MassStorage/02_Overview/chapter_2_section_4.html>.
'Shared Storage Model'. SNIA Technical Council [online]. Apr. 13, 2003. [retrieved on Mar. 6, 2006]. Retrieved from the Internet: <URL: http://www.snia.org/tech_activities/shared_storage_model/SNIA-SSM-text-2003-04-13.pdf>.
Strange, John. 'New Storage Stack Architecture—Cobra'. Microsoft Corporation [online]. 2004. [retrieved on Mar. 6, 2006]. Retrieved from the Internet: <URL: http://download.microsoft.com/download/1/8/f/18f8cee2-0b64-41f2-893d-a6f22954b40c8/DW4025_WINHEC2004.ppt>.

* cited by examiner

*Primary Examiner*—Henry W. H. Tsai
*Assistant Examiner*—John B Roche
(74) *Attorney, Agent, or Firm*—Baker Botts L.L.P.

(57) ABSTRACT

An exemplary embodiment provides for a device driver embodied in a computer readable medium. The device driver includes instructions operative to cause a programmable processor to receive a command and perform a determination as to whether the command is a drive command or a media changer command. The command is then conditionally modified, based on the determination and the command is forwarded.

20 Claims, 8 Drawing Sheets

MULTIPLE LUN SUPPORT FOR SATA DEVICES

BACKGROUND

Small computer system interface (SCSI) is a ubiquitous parallel interface standard used for data transfer, typically data transfer between a storage drive and a computer. Contained in the SCSI standard are provisions for logical unit numbers ("LUN") which are unique identifiers used on a SCSI bus to distinguish between different devices that share that same SCSI bus. Typically, eight devices will be given a unique address ranging from 0-7 for an 8-bit bus or 16 devices will be given a unique address ranging from 0-15 for a 16-bit bus. Commands that are sent to a SCSI controller are routed to their correct destination device based on the LUN assignment information associated with the command.

In some implementations, a SCSI controller may perhaps be embedded in an external drive and additional devices are in turn connected to that drive. In such an environment, the external drive would act as a "bridging" device in that the drive can bridge commands received from a host to devices attached, to the drive, via their assigned LUN. Such a configuration is sometimes employed in automated media changer systems wherein the media changer system is connected to the external drive.

While the SCSI standard is a proven technology and has been utilized for a long period of time, new standards are emerging as alternatives to the SCSI standard. One such emerging standard is the serial ATA ("SATA") protocol and it may be desirous to implement an SATA drive in place of the SCSI drive in the above-illustrated implementation. However, the SATA protocol does not provide for multiple LUNs. In other words, for some operating systems, it is not possible for multiple LUNs to exist beneath a single target identifier from the perspective of the host operating system. In light of the foregoing, a need in the art exists for methods, apparatuses and systems that allow for, or facilitate, implementation of multiple logical unit numbers in an SATA environment.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, apparatuses and methods which are meant to be exemplary and illustrative, not limiting in scope. One embodiment by way of non-limiting example provides for a device driver embodied in a computer readable medium. The device driver includes instructions operative to cause a programmable processor to receive a command and perform a determination as to whether the command is a drive command or a media changer command. The command is then conditionally modified, based on the determination and the command is forwarded.

Another embodiment by way of non-limiting example provides for a storage drive that is operable to identify and bridge media changer commands. The storage drive includes one or more processors, a memory, a target adapter for connection to a host system and a device controller for connection to a media changer system. Also included is a device driver, stored in the memory, that includes instructions that cause the device controller, the one or more processors, the target adapter and the device controller to receive a command from the host system, determine if the command is a media changer command and bridge the command to the media changer system, if the command is the media changer command.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be considered illustrative rather than limiting.

DETAILED DESCRIPTION

The following embodiments and aspects thereof are described and illustrated in conjunction with systems, apparatuses and methods which are meant to be exemplary and illustrative, not limiting in scope.

The claimed embodiments contemplate systems, apparatuses and methods for processing and delivery of media changer commands through a host and an SATA-type bridging device to a media changer device—in essence, providing for multiple LUN functionality in an SATA device. In some implementations, the claimed embodiments take the form of a driver on a host. The driver is operative to portray to the host that two peripheral devices are connected when only one actually is. That is, the devices are connected in a serial fashion—host, first device and then second device. In a preferred embodiment, that first device is an SATA drive and the second device is a media changer system. In practice, the driver receives a command, determines a command type and packages the command if the command is a media changer system command. The host then forwards the command to the SATA drive. At the SATA drive, the command is received, and the drive determines if the command is a media changer command. If it is, the drive bridges the command to the media changer system. As will be seen by a review of the subsequent description and figures, the claimed embodiments, advantageously, are operable to provide multiple LUN functionality in a SATA-type environment.

Throughout the foregoing description, there are various terms and phrases that may be used interchangeably in reference to an automated library system. These terms and phrases include, but are not limited to, "automation device," "media changer device," "media changer," "media changer system," and "automated library system." This preceding list is not meant to be limiting and can well include other similar terms and phrases, even those terms and phrases that do not include words contained in the preceding list.

Figure 1:
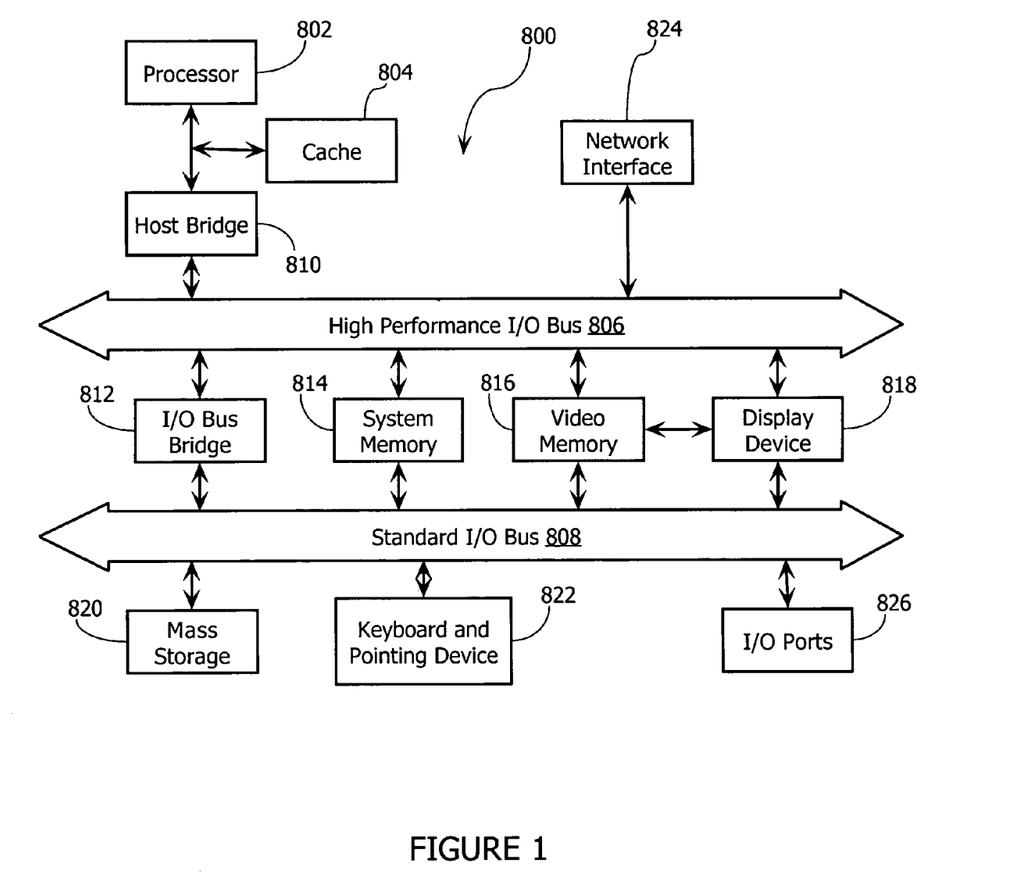
FIG. 1 is, for didactic purposes, a block diagram of a hardware system, which can be used to implement portions of the claimed embodiments.

Before a thorough discussion of the claimed embodiments is discussed, FIGS. 1-4 will first be presented. FIGS. 1-4 describe various exemplary devices that can be used for or in conjunction with the claimed embodiments. FIG. 1 illustrates, for didactic purposes, a hardware system 800, which can be used to implement portions of the claimed embodiments. In one embodiment, hardware system 800 includes processor 802 and cache memory 804 coupled to each other as shown. Additionally, hardware system 800 includes high performance input/output (I/O) bus 806 and standard I/O bus 808. Host bridge 810 couples processor 802 to high performance I/O bus 806, whereas I/O bus bridge 812 couples the two buses 806 and 808 to each other. Coupled to bus 806 are network/communication interface 824, system memory 814, and video memory 816. In turn, display device 818 is coupled to video memory 816. Coupled to bus 808 are mass storage 820, keyboard and pointing device 822, and I/O ports 826. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 800 perform the functions described below. Mass storage 820 is used to provide permanent storage for the data and programming instructions to perform the above described functions implemented in the system controller, whereas system memory 814 (e.g., DRAM) is used to provide temporary storage for the data and programming instructions when executed by processor 802. I/O ports 826 are one or more serial and/or parallel communication ports used to provide communication between additional peripheral devices, which may be coupled to hardware system 800.

Hardware system 800 may include a variety of system architectures and various components of hardware system 800 may be rearranged. For example, cache 804 may be on-chip with processor 802. Alternatively, cache 804 and processor 802 may be packed together as a "processor module", with processor 802 being referred to as the "processor core". Furthermore, certain implementations of the present invention may not require nor include all of the above components. For example, the peripheral devices shown coupled to standard I/O bus 808 may be coupled to high performance I/O bus 806. In addition, in some implementations only a single bus may exist with the components of hardware system 800 being coupled to the single bus. Furthermore, additional components may be included in system 800, such as additional processors, storage devices, or memories.

In one embodiment, the operations of the claimed embodiments are implemented as a series of software routines run by hardware system 800. In one implementation, the hardware system 800 is configured to implement the driver stack illustrated in FIG. 6. These software routines comprise a plurality or series of instructions to be executed by a processor in a hardware system, such as processor 802. Initially, the series of instructions are stored on a storage device, such as mass storage 820. However, the series of instructions can be stored on any suitable storage medium, such as a diskette, CD-ROM, ROM, etc. Furthermore, the series of instructions need not be stored locally, and could be received from a remote storage device, such as a server on a network, via network/communication interface 824. The instructions are copied from the storage device, such as mass storage 820, into memory 814 and then accessed and executed by processor 802. In alternate embodiments, the claimed embodiments are implemented in discrete hardware or firmware.

While FIG. 1 illustrates, for didactic purposes, a typical hardware architecture, the claimed embodiments, however, can be implemented on a wide variety of computer system architectures, such as network-attached servers, laptop computers, and the like. An operating system manages and controls the operation of system 800, including the input and output of data to and from software applications (not shown). The operating system provides an interface, such as a graphical user interface (GUI), between the user and the software applications being executed on the system. According to one embodiment of the present invention, the operating system is the Windows® 95/98/NT/XP operating system, available from Microsoft Corporation of Redmond, Wash. However, the claimed embodiments may be used with other operating systems, such as the Apple Macintosh Operating System, available from Apple Computer Inc. of Cupertino, Calif., UNIX operating systems, LINUX operating systems, and the like.

Figure 2:
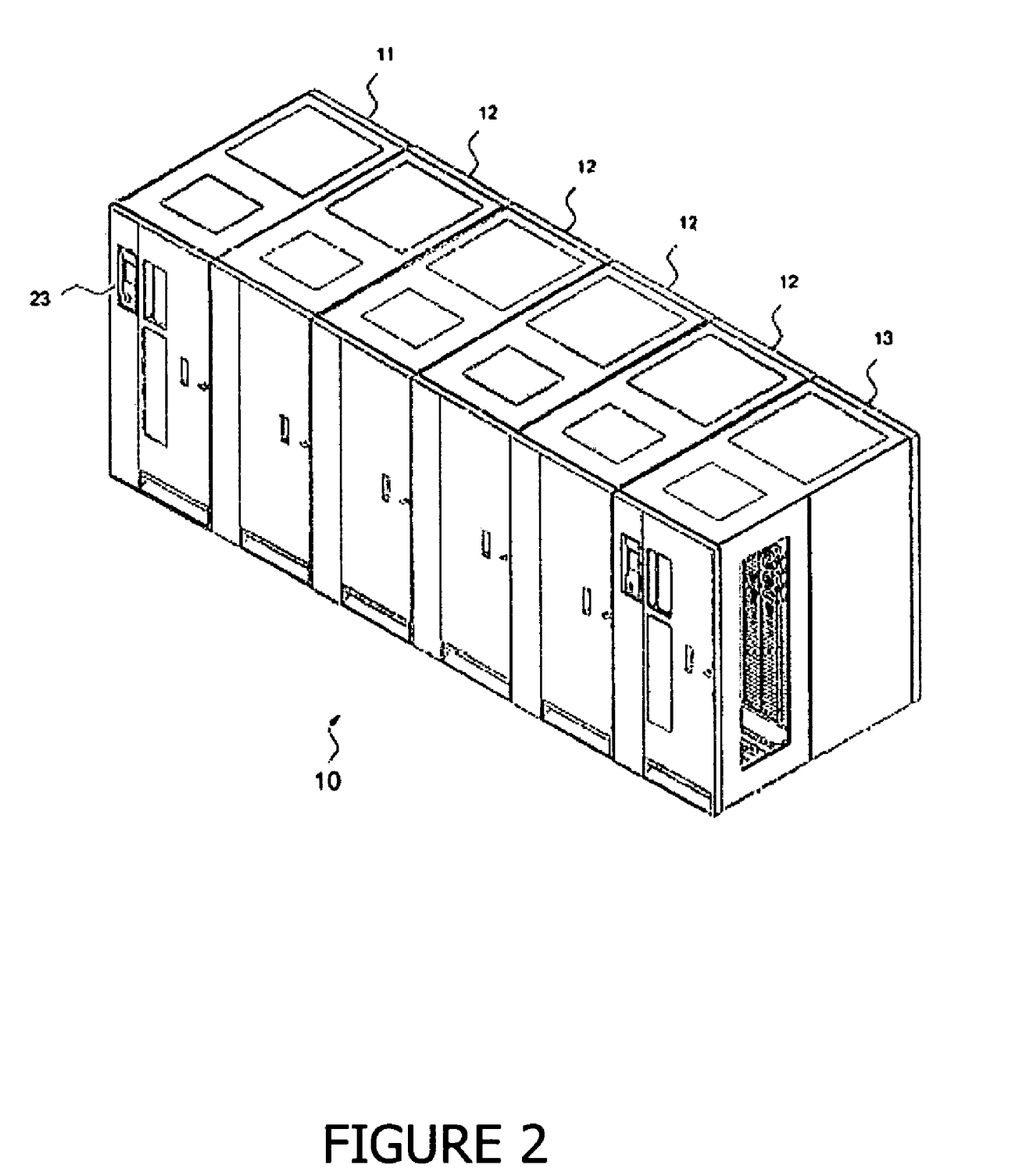
FIG. 2 illustrates an automatic data storage library which can be used in conjunction with the claimed embodiments.
Figure 3:
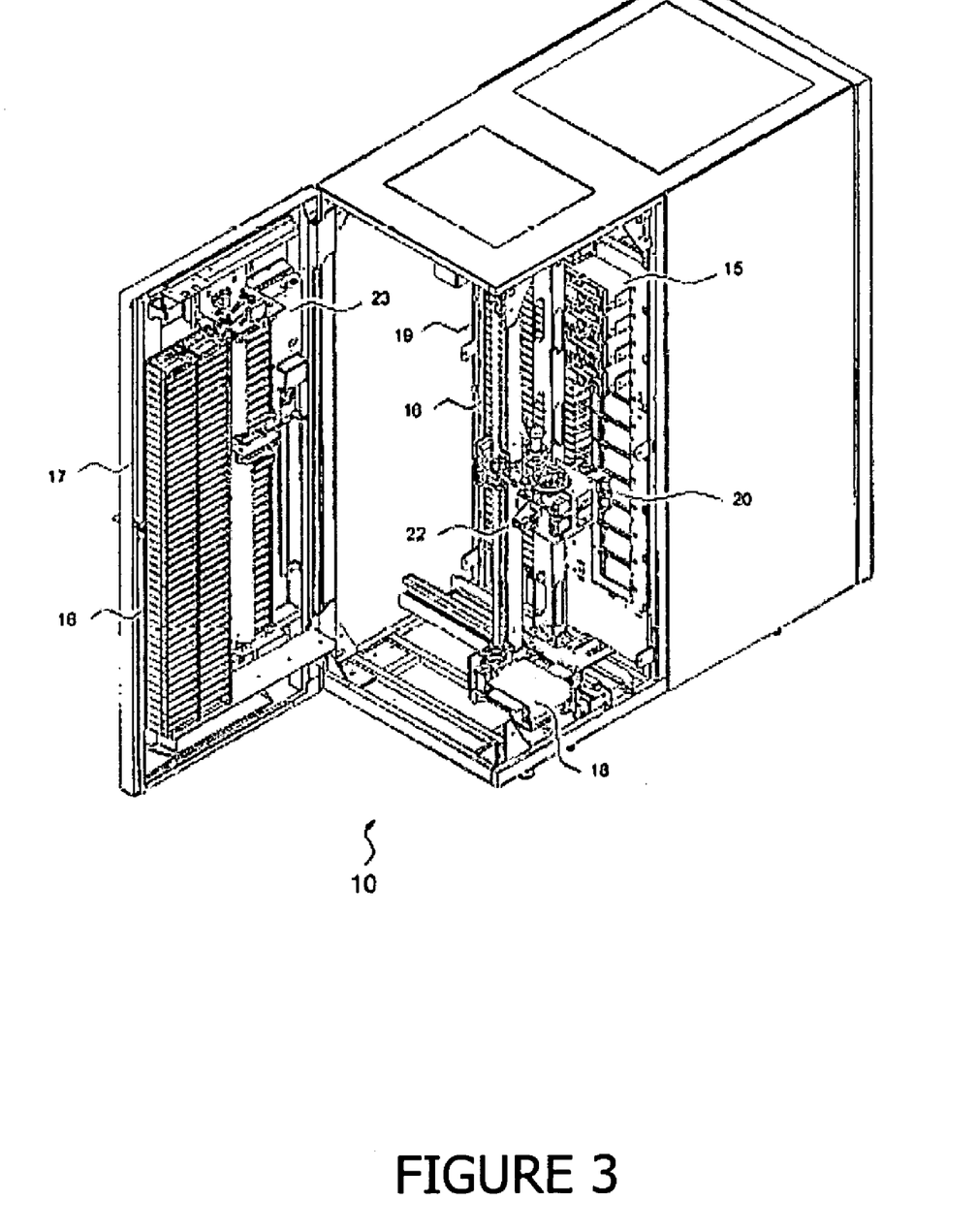
FIG. 3 illustrates a detailed internal view of a frame of the automatic data storage library of FIG. 2.

FIG. 2 illustrates a typical automated data storage library 10 which can be used in conjunction with the claimed embodiments. FIG. 3 illustrates a detailed internal view of a frame (11, 12, 13) of the automatic data storage library 10 of FIG. 2. The library is arranged for accessing data storage media (not shown) in response to commands from at least one external host system (not shown) such as system 800, and comprises storage shelves 16 on a front wall 17 and a rear wall 19 for storing data storage media. The library 10 further comprises at least one data storage drive 15 for reading and/or writing data with respect to the data storage media and at least one robot accessor 18 for transporting the data storage media between the storage shelves 16 and the data storage drive(s) 15. The data storage drives 15, for example, may be optical disk drives or magnetic tape drives and the data storage media may comprise optical or magnetic tape media, respectively, or any other removable media associated with corresponding drives. The library 10 may also comprise an operator panel 23 or other user interface, such as a web-based interface, which allows a user to interact with the library 10. Additionally, a control port (not shown) may be provided, which permits communications between a host and the library, e.g., for receiving commands from a host and forwarding the commands to the library, but which is possibly not a data storage drive. The library 10 may comprise one or more frames 11, 12 and 13, each having storage shelves 16 accessible by the robot accessor 18. The robot accessor 18 comprises a gripper assembly 20 for gripping one or more data storage media and may also include a bar code scanner 22 or other reading system, such as a smart card reader, mounted on the gripper 20 to "read" identifying information about the data storage media.

Figure 4:
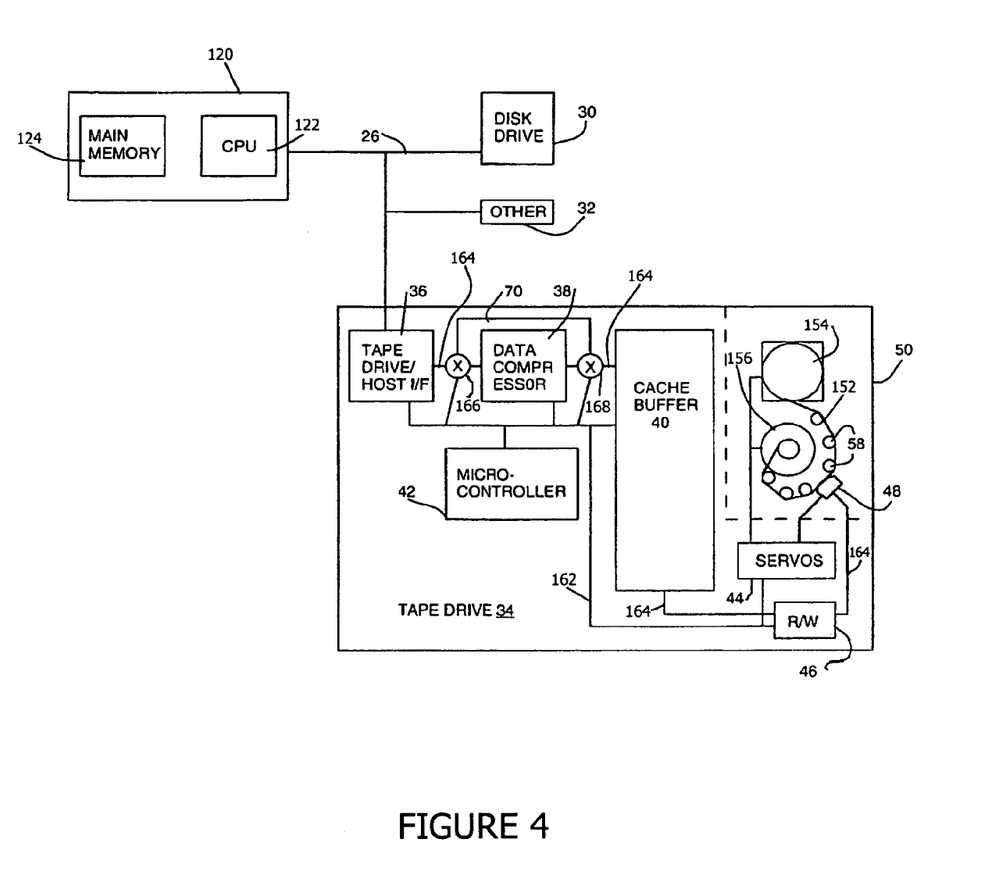
FIG. 4 is a simplified block diagram of a tape drive, in accordance with principles of the claimed embodiments, operatively connected within a host computing environment.

FIG. 4 represents a typical, computing environment for explaining principles of the claimed embodiments. In this example, a host computer 120 including at least a central processing unit (CPU) 122 and a main memory 124, communicates with peripheral computing equipment via an interface bus structure 26, which may be a broad-band parallel or serial bi-directional path, or other suitable interconnection. Peripherals may include a hard disk drive 30, other devices 32, such as printers, terminals, etc., and a tape drive 34.

The tape drive 34 includes a tape drive/host interface circuit 36 for connecting the tape drive 34 to the bus structure 26. The tape drive 34 also includes a data compressor circuit 38 operating in accordance with a conventional data compression and compaction algorithm, such as Lempel-Zev, type 1 (LZ1). The tape drive 34 includes a suitably sized cache buffer memory 40, which in this example may be a four megabyte solid state random access memory array including an array controller (not separately shown). The tape drive 34 includes a programmed microcontroller 42 for controlling the various circuit elements and processes as more fully explained hereinafter. The tape drive 34 also includes motor speed, tape tensioning, and head positioning servo circuitry 44, and a data read/write electronics channel 46 leading to a head structure 48 within a tape transport mechanism 50 (which is shown in FIG. 1 to be separated by dashed lines from the rest of the electronics circuitry of the tape drive 34).

Magnetic recording tape 152, supplied from e.g. a single feed reel cartridge 154, is spooled onto an internal take up reel 156 after having passed sinuously around a plurality of tape guide rollers 58 and past the head structure 48. In this example an automatic tape buckling mechanism, not shown and not particularly pertinent to an understanding of the present invention, enables coupling of the tape from the cartridge 154 to a leader attached to the take up reel 156.

The tape drive/host interface 36 is connected to the head structure 48 via an internal data path 164 which includes the data compressor 38, the cache buffer 40 and the read/write circuitry 46. In accordance with aspects of the present invention, two control nodes 166 and 168 span the data compressor 38 within the data path 164 and are interconnected by a bypass path 70, the function of which will be explained in greater detail hereinafter.

The microcontroller 42 is connected to an internal control bus structure 162 which enables the microcontroller 42 to monitor and control the tape drive/host interface circuit 36, the data compressor 38, the cache buffer 40, the servos circuitry 44, and the read/write channel electronics 46. The microcontroller 42 also controls the two control nodes 166 and 168 spanning the data compressor 38. It will therefore be appreciated that a user data record incoming from the host computer 120 (or disk drive 30) may be passed directly into the data compressor 38 and then into the cache buffer 40 in compressed format, or the data record may be passed directly into the cache buffer 40 without being compressed, in accordance with the states of the control nodes 166 and 168 spanning the data compressor 38 within the internal data path 164. Also, it should be appreciated that some process latency exists within the data compressor 38, so that some time elapses from the time an un-encoded user data record enters the compressor 38 until compressed data derived from the user data record completes exiting out of the compressor.

It should be noted that tape drive 34 can utilize removable media such as a tape cassette. It should additionally be noted that the claimed embodiments can be practiced with other removable media such as a CD drive, a DVD drive, a floppy drive, an optical drive, etc.

Figure 5:
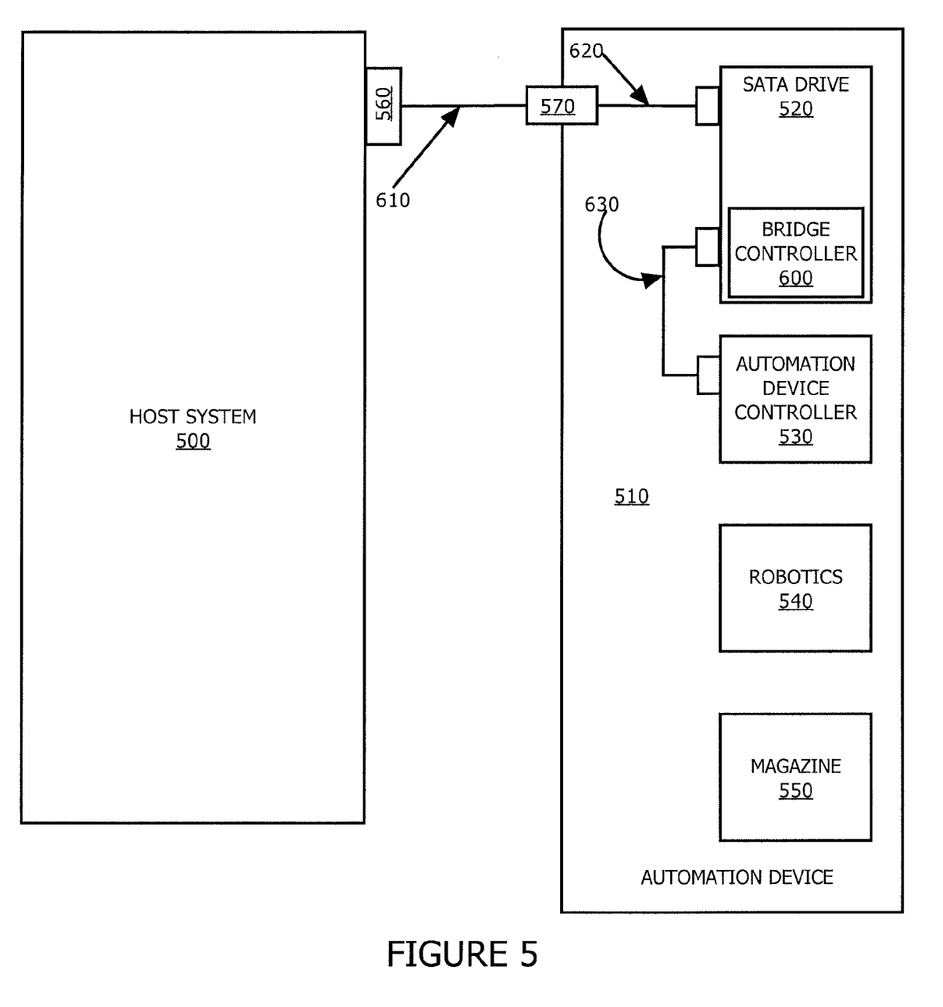
FIG. 5 is a block diagram illustrating a host system connected to an automation device in which aspects of the claimed embodiments may operate.

Description of the various devices, for which the claimed embodiments may be practiced in conjunction with or upon, is now complete. Therefore, the claimed embodiments will now be discussed in detail beginning with FIG. 5 which is a block diagram illustrating a host system 500 connected to an automation device 510 in which aspects of the claimed embodiments may operate. Host system 500 is similar to system 800 of FIG. 1, SATA drive 520 is similar to drive 34 of FIG. 4 and automation device, of which drive 520 is part of, is similar to automated data storage library 10 of FIGS. 2-3. Automation device further includes an automation device controller 530, robotics 540 and magazine 550. Also included are I/O ports (560 and 570), bridge controller 600 and various connections (610, 620 and 630). As previously indicated, SATA drive 520 is enabled with LUN functionality. Therefore, automation device commands generated from system 500 can be bridged through drive 520 to the automation device controller 530. In one implementation, drive 520 is separate from automation device 510.

Figure 6:
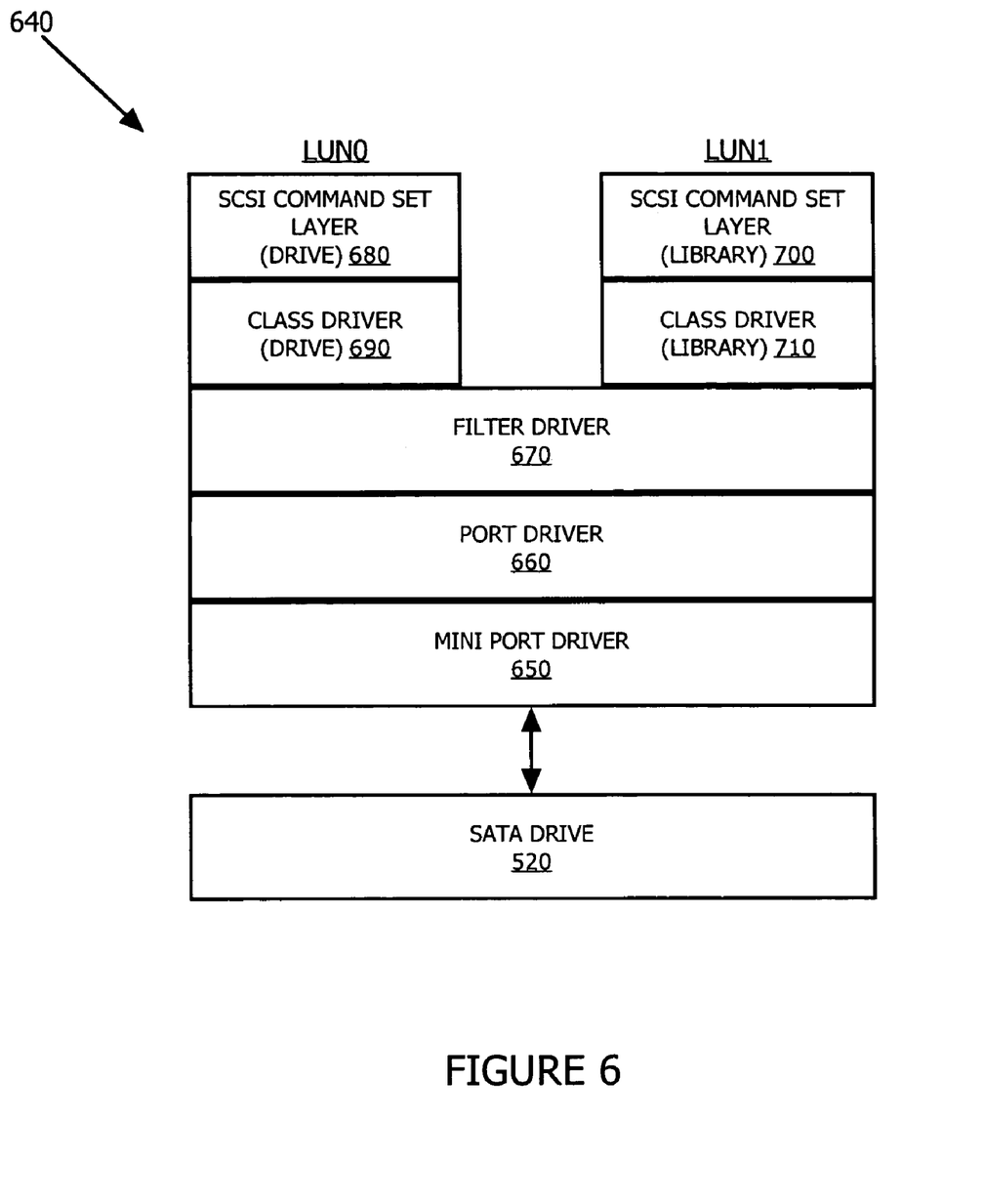
FIG. 6 is a block diagram illustrating a driver stack, in accordance with an exemplary embodiment.

In order to properly transmit an automation device command from host 500 through drive 520 to automation device controller 530, an appropriate driver stack can be employed in host 500 to partly achieve the claimed embodiments. For example, FIG. 6 is a block diagram illustrating a driver stack 640, in accordance with an exemplary embodiment. Included in stack 640 are numerous drivers. Mini port driver 650 and port driver 660 are kernel-mode drivers, specific to an individual device or piece of hardware that is linked to the Windows Driver Model. Typically, either the mini port driver 650 or the port driver 660 will be employed in transmitting commands to drive 520. The decision on which one to use depends on hardware configuration. For example, if SATA hardware is located on a daughterboard contained in system 500, then the mini port driver 650 will typically be used. If SATA hardware is located on a motherboard contained in system 500, then the port driver 660 will typically be employed.

Filter driver 670 is placed on top of the port drivers (650, 660) and is operable to present drive 520 and automation device controller 530 to host system 500 as two separately attached devices even though automation device controller 530 is not directly linked to system 500. To that end, filter driver 670 emulates two devices and presents two sets (LUN0, LUN1) of SCSI command set layers and class drivers to system 500. A first set for the drive 520 is LUN0 and includes SCSI command set layer 680 and class driver 690. Similarly, LUN1 for the library/automation device controller 530 includes SCSI command set layer 700 and class driver 710. To ensure that filter driver 670 is able to present two devices to system 500, it can be loaded twice, for example, at system 500's startup through two entries in system 500's registry. As system 500 goes through device discovery, the two entries of filter driver 670 will be loaded. Alternatively, filter driver 670 could present itself as two instances of port drivers. In such an implementation, the filter driver 670 maintains state information to make sure it registers both devices with the operating system at boot up to ensure that higher layer drivers are loaded. Of course, there are other methods for device driver 670 to present two devices to system 500 and the claimed embodiments are not necessarily limited to the preceding examples.

Figure 7:
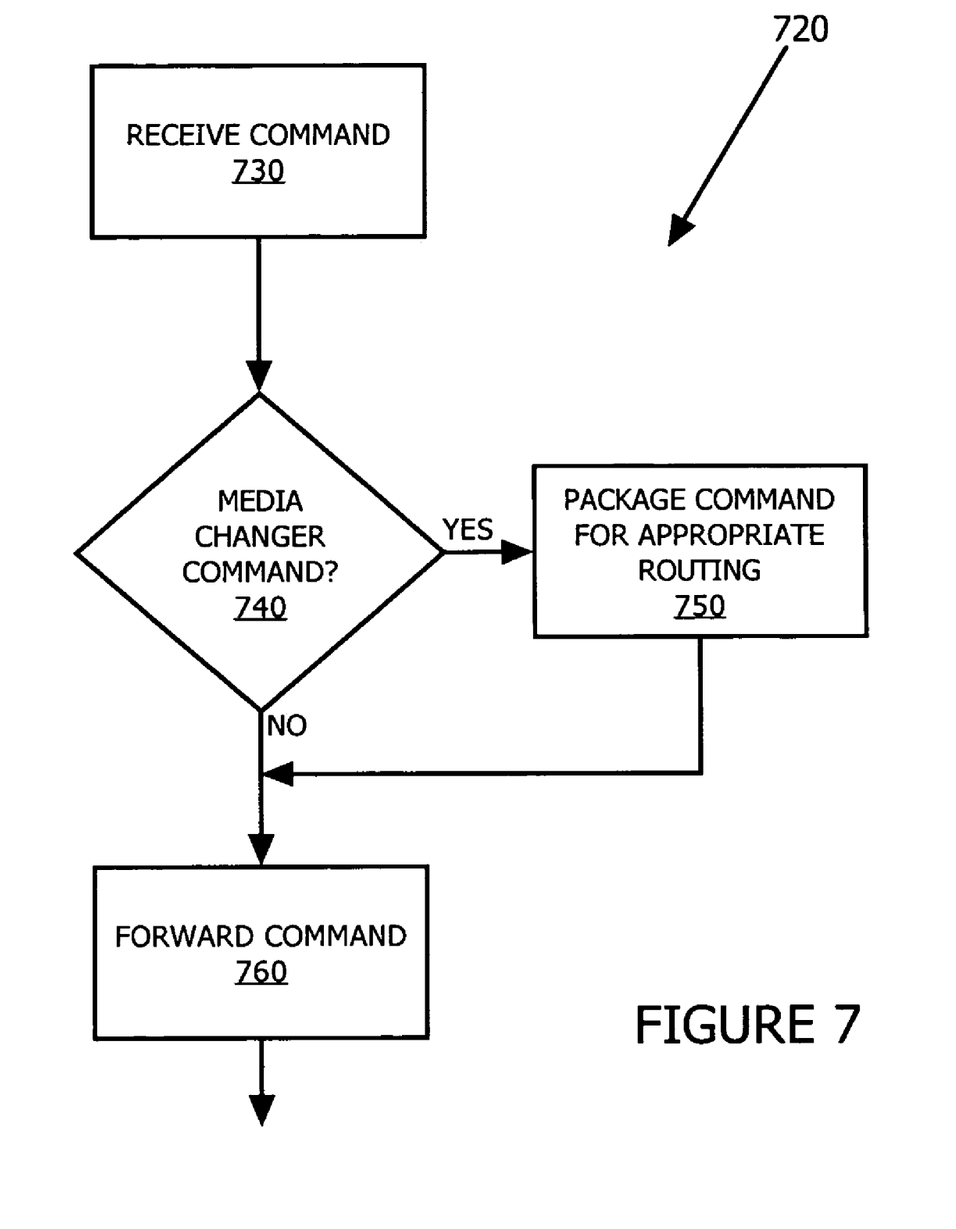
FIG. 7 is a flowchart illustrating a method for a driver to package a media changer command, in accordance with an exemplary embodiment.

Methods illustrating how a media changer command is processed at a host and SATA drive will now be presented. FIG. 7 is a flowchart illustrating a method 720 for a driver to package a media changer command, in accordance with an exemplary embodiment. Method 720 describes how the filter driver 670, loaded on the system 500, identifies a media changer command and packages the media command for bridging by the automated storage system. Initially, the driver 720 receives a command (730) and determines if it is a media changer command (740). If yes, the driver packages the media changer command for appropriate routing (750). In other words, if the command is a media changer command, the driver modifies that media changer command so that the SATA drive (520) will recognize it and bridge the media changer command to the automated device controller 530. In one implementation, filter driver 670 distinguishes between commands received from the upper layer drivers 690, 710 corresponding to the drive and the library (media changer), respectively. In other words, commands received from class driver 710 are packaged or modified for bridging by the SATA Drive 520, while commands received from class driver 690 are forwarded without addition of an opcode (see below) or other indicator. As FIG. 7 shows, filter driver 670 then forwards the command (760) to port driver 660 for processing. Eventually, a command is transmitted to SATA drive 520.

Packaging the media changer command (750) can be accomplished in a variety of ways. In one implementation, the media changer command is encoded with an operational code ("opcode") instruction and compressed. In another implementation, an opcode is inserted in the command, for example at the first byte, and the command is strobed to the SATA drive 520. In other words, the first byte, with the opcode, indicates to the SATA drive 520 that a media changer command is coming through and the balance of the command is then sent in a serial manner. The value of the opcode can be any suitable value recognized by the storage system controller.

Figure 8:
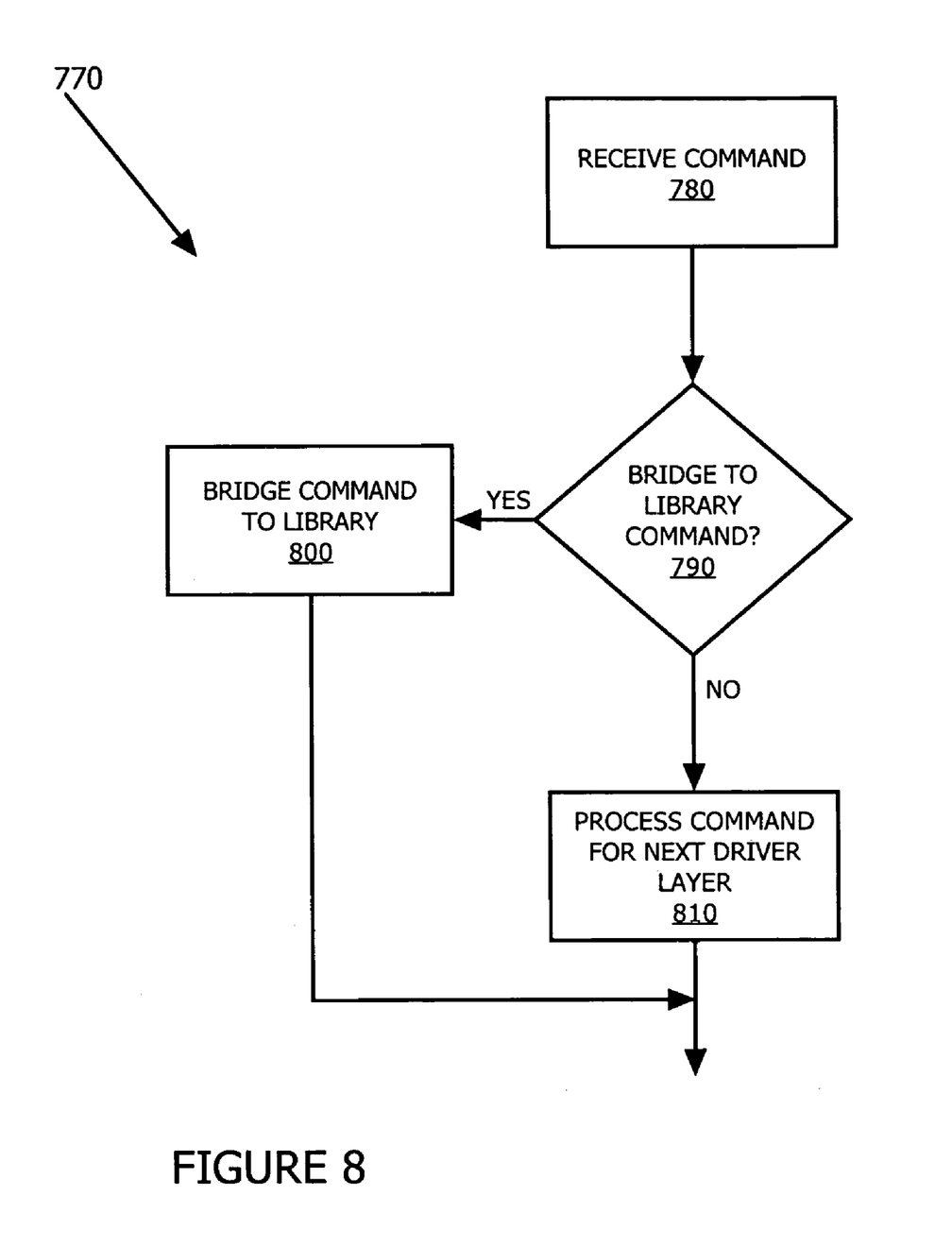
FIG. 8 is a flowchart illustrating a method for bridging a command to another device, in accordance with an exemplary embodiment.

After a command is sent to the drive 520, the drive performs further processing on the command. To illustrate further, FIG. 8 is a flowchart illustrating a method 770 for bridging a command to another device, in accordance with an exemplary embodiment. Method 770 describes how the SATA drive 520 handles a command received from the system 500. In short, the drive 520 determines if the received command is a media changer command (in one implementation, by detecting the opcode added by the filter driver 670 of the host system). If it is, the command is bridged to a media changer device.

To further elaborate, the drive 520 receives a command (780). Next, the drive 520 makes a determination (790) to see if it is a media changer/bridge to library command. If yes, the drive 520 sends the command (800) to the automation device controller 530. Otherwise, the drive 520 processes the command, forwarding the command to the next driver layer of the drive 520 (810).

While aspects of the claimed embodiments have been framed in view of providing multiple LUN-functionality in an SATA-environment, it should be understood that those claimed embodiments are not limited to an SATA-environment. Therefore, the claimed embodiments can be implemented in other environments that do not already provide multiple LUN-functionality.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A device driver embodied in a computer readable medium, wherein the device driver comprises instructions operative to cause a programmable processor to:
concurrently emulate a first device and a second device to a host system, wherein each device is identified to the host system by a unique logic unit number (LUN);
receive a command addressed to one of the two devices;
determine to which one of the first device and the second device the command is addressed;
if the command is addressed to the first device, forward the command to the first device; and
if the command is addressed to the second device, modify the command by embedding an operation code instruction into the command, which indicates to the first device that the command is addressed to the second device, and forward the modified command to the first device.

2. The device driver as recited in claim 1, wherein the operation code instruction facilitates eventual delivery of the modified command to the second device.

3. The device driver as recited in claim 2 wherein the device driver further comprises instructions operative to cause the programmable processor to compress the command.

4. The device driver as recited in claim 1, wherein to modify and forward the command when the command is addressed to the second device, the device driver further comprises instructions operative to cause the programmable processor to:
forward an identifier to indicate that a media changer command will be sent next; and
forward the modified command.

5. The device driver as recited in claim 1, wherein the second device is a destination automated library system.

6. In a system operable to generate and forward media changer and drive commands, a method for conditionally modifying a command, the method comprising:
concurrently emulating a first device and a second device to a host system, wherein each device is identified to the host system by a unique logic unit number (LUN);
receiving a command addressed to one of the two devices;
determining to which one of the first device and the second device the command is addressed;
if the command is addressed to the first device, forwarding the command to the first device; and
if the command is addressed to the second device, modifying the command by embedding an operation code instruction into the command, which indicates to the first device that the command is addressed to the second device, and forwarding the modified command to the first device.

7. The method as recited in claim 6, wherein the operation code instruction facilitates eventual delivery of the command to the second device.

8. The method as recited in claim 7 further comprising compressing the command.

9. The method as recited in claim 6, wherein forwarding the modified command to the media changer system comprises:
forwarding an identifier to indicate that a media changer command will be sent next; and
forwarding the modified command.

10. The method as recited in claim 7 wherein the destination media changer system is a destination automated library system.

11. In a SATA drive operable to identify and bridge media changer commands, a method comprising:
receiving a command from a host system at the SATA drive;
determining whether an operation code instruction is embedded in the command, wherein the operation code instruction indicates to the SATA drive that the command is addressed to a media changer system;
if the operation code instruction is embedded in the command, forwarding the command to the media changer system connected to the SATA drive; and
if the operation code instruction is not embedded in the command, processing the command at the SATA drive.

12. The method as recited in claim 11, wherein the media changer system is an automated library system.

13. A system operable to generate and forward media changer and drive commands, the system comprising:
one or more processors;
a memory;
a host adapter; and a plurality of drivers, stored in the memory, wherein the plurality of drivers includes at least two command set layers each corresponding to only one of at least one drive or at least one media changer, a port driver and a filter driver, wherein the filter driver further includes instructions operable to cause the one or more processors and the host adapter to:
concurrently emulate a first device and a second device to a host system, wherein each device is identified to the host system by a unique logic unit number (LUN);
receive a command addressed to one of the two devices;
determine to which one of the first device and the second device the command is addressed;
if the command is addressed to the first device, forward the command to the first device; and
if the command is addressed to the second device, modify the command by embedding an operation code instruction into the command, which indicates to the first device that the command is addressed to the second device, and forward the modified command to the first device.

14. The system as recited in claim 13, wherein the operation code instruction facilitates eventual delivery of the modified command to the second device.

15. The system as recited in claim 14 further comprising instructions operable to cause the one or more processors to compress the command.

16. The system as recited in claim 13, wherein modify and forward the command when the command is addressed to the second device comprises instructions operable to cause the one or more processors to:
forward an identifier to indicate that a media changer command will be sent next; and
forward the modified command.

17. The system as recited in claim 14 wherein the second device is an automated library system.

18. A SATA drive operable to identify and bridge media changer commands, the drive comprising:
one or more processors;
a memory;
a target adapter for connection to a host system;
a device controller for connection to a media changer system; and
a device driver, stored in the memory, including instructions operable to cause the device controller, the one or more processors and the target adapter to:
receiving a command from a host system at the SATA drive;
determine whether an operation code instruction is embedded in the command, wherein the operation code instruction indicates to the SATA drive that the command is addressed to a media changer system;
if the operation code instruction is embedded in the command, forward the command to the media changer system connected to the SATA drive; and
if the operation code instruction is not embedded in the command, process the command at the SATA drive.

19. The drive as recited in claim 18 wherein connections to the target adapter and the device controller can be selected from the group consisting of a physical connection and a virtual connection.

20. The drive as recited in claim 18, wherein the media changer system is an automated library system.

* * * * *